United States Patent [19]

George

[11] 4,164,089
[45] Aug. 14, 1979

[54] PORTABLE BLIND

[76] Inventor: Warren T. George, 1611 Clark Ave., Billings, Mont. 59102

[21] Appl. No.: 819,048

[22] Filed: Jul. 26, 1977

[51] Int. Cl.² ..................... A01M 31/02; E04G 11/04
[52] U.S. Cl. ......................................... 43/1; 135/1 R
[58] Field of Search ............................. 135/1 R; 43/1

[56] References Cited

U.S. PATENT DOCUMENTS

| 1,031,851 | 7/1912 | Jannary | 43/1 |
| 2,168,913 | 8/1939 | Middleton | 135/1 R |
| 3,540,170 | 11/1970 | Flowers | 43/1 |
| 3,609,905 | 10/1971 | Fuhrman et al. | 135/1 R |
| 3,690,334 | 9/1972 | Miller | 135/1 R |
| 3,899,853 | 8/1975 | Wertman | 135/1 R |
| 3,902,264 | 9/1975 | Radig | 43/1 |

FOREIGN PATENT DOCUMENTS 551441 2/1943 United Kingdom ................. 135/1 R

Primary Examiner—William Pieprz
Attorney, Agent, or Firm—John J. Byrnz

[57] ABSTRACT

A portable blind for a hunter, photographer, naturalist, or the like, comprising one or more frame assemblies with a flexible exterior covering. Each frame assembly includes upright legs which are joined at the upper end thereof by a frame member. The frame assemblies are fabricated from lightweight materials such as aluminum or plastic tubular members or inflatable members which may be easily transported to a desired site. A flexible exterior covering is connected to the frame assemblies and preferably includes one or more viewing ports. At a selected site the frame assembly or assemblies are set up and operably positioned to form a shell with a covering and viewing port in an upper portion of the blind.

10 Claims, 7 Drawing Figures

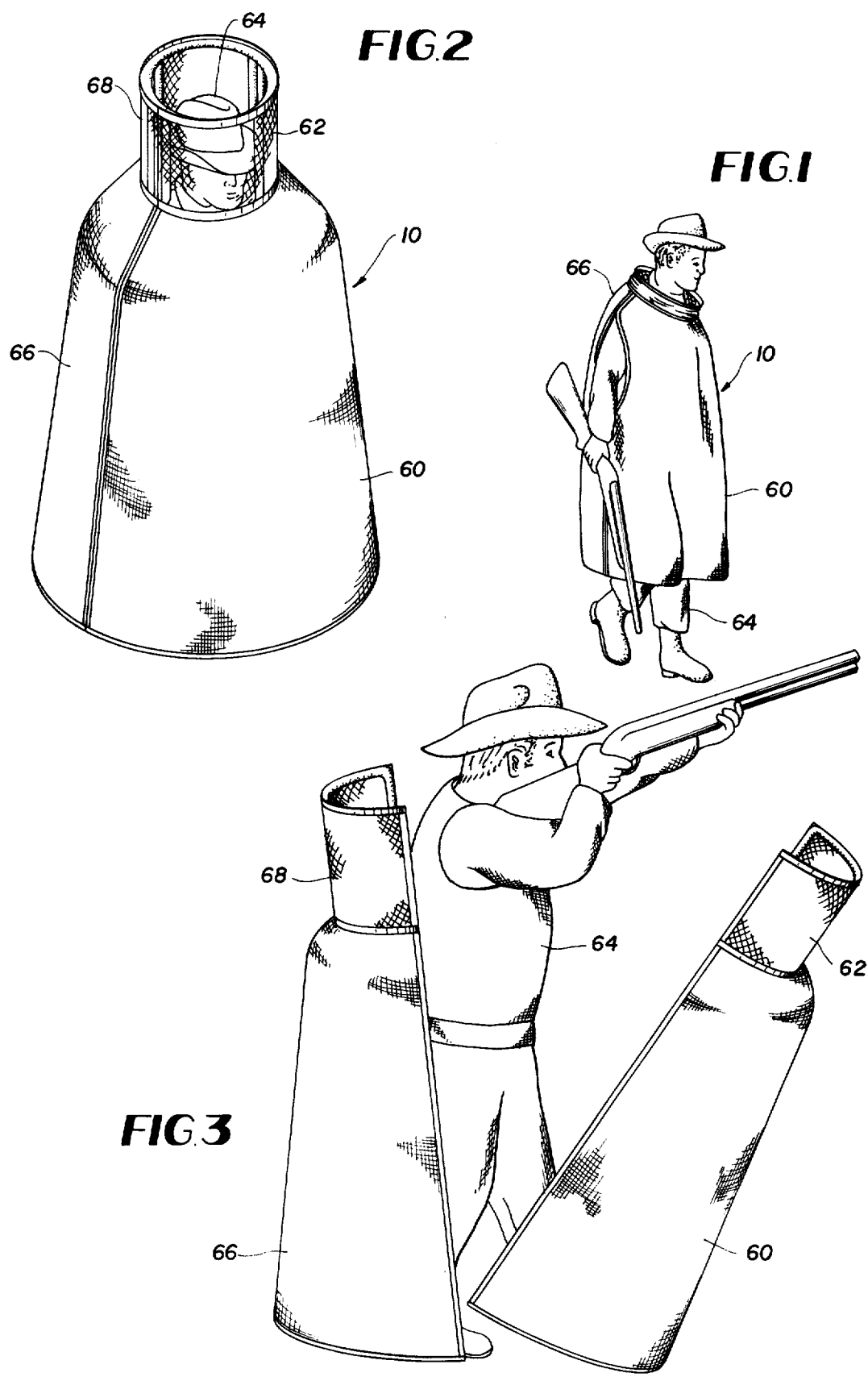

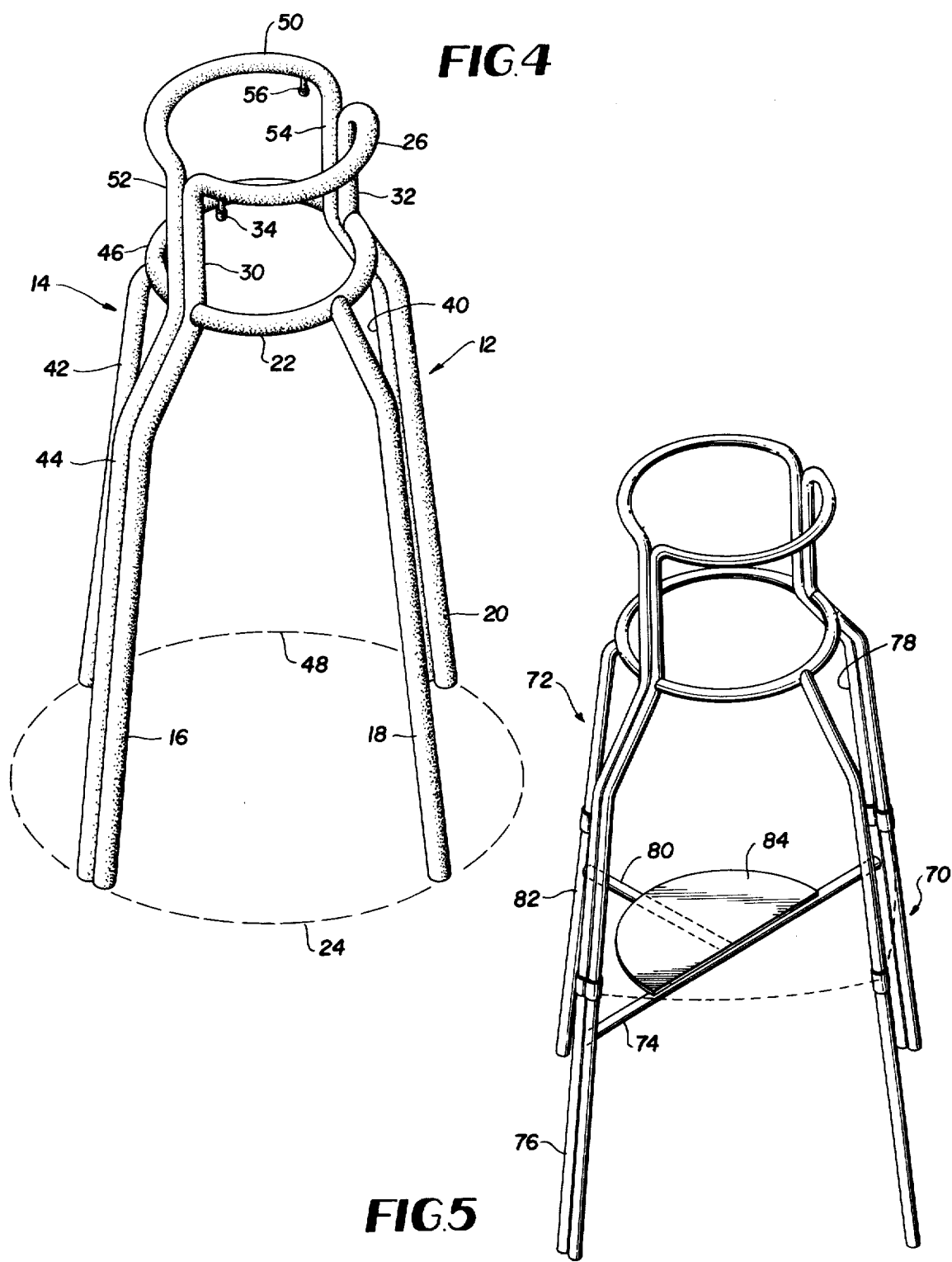

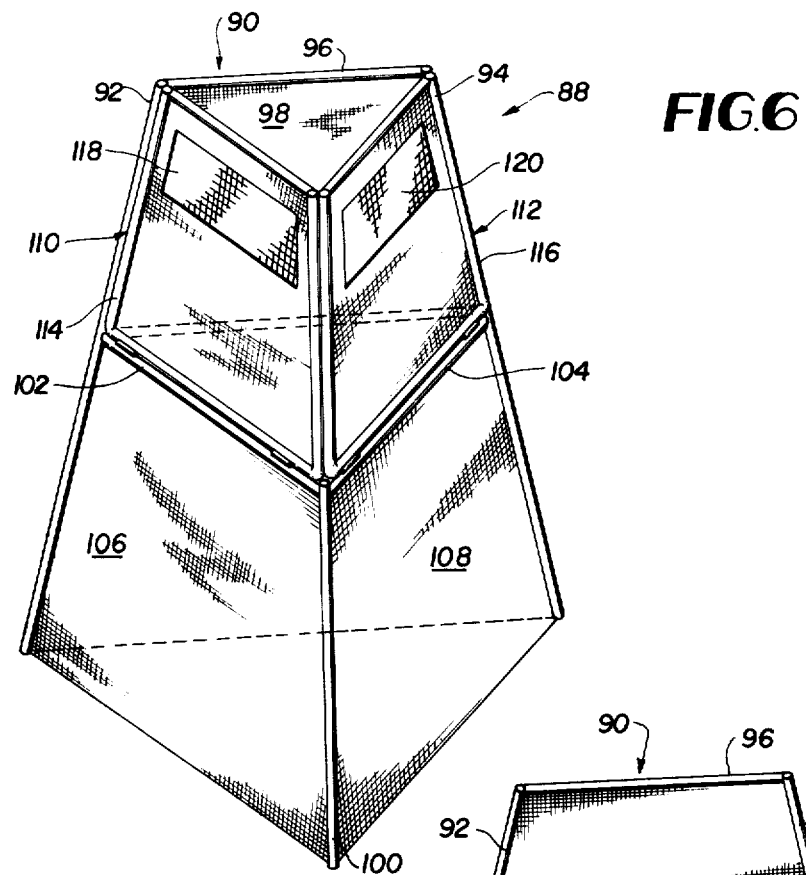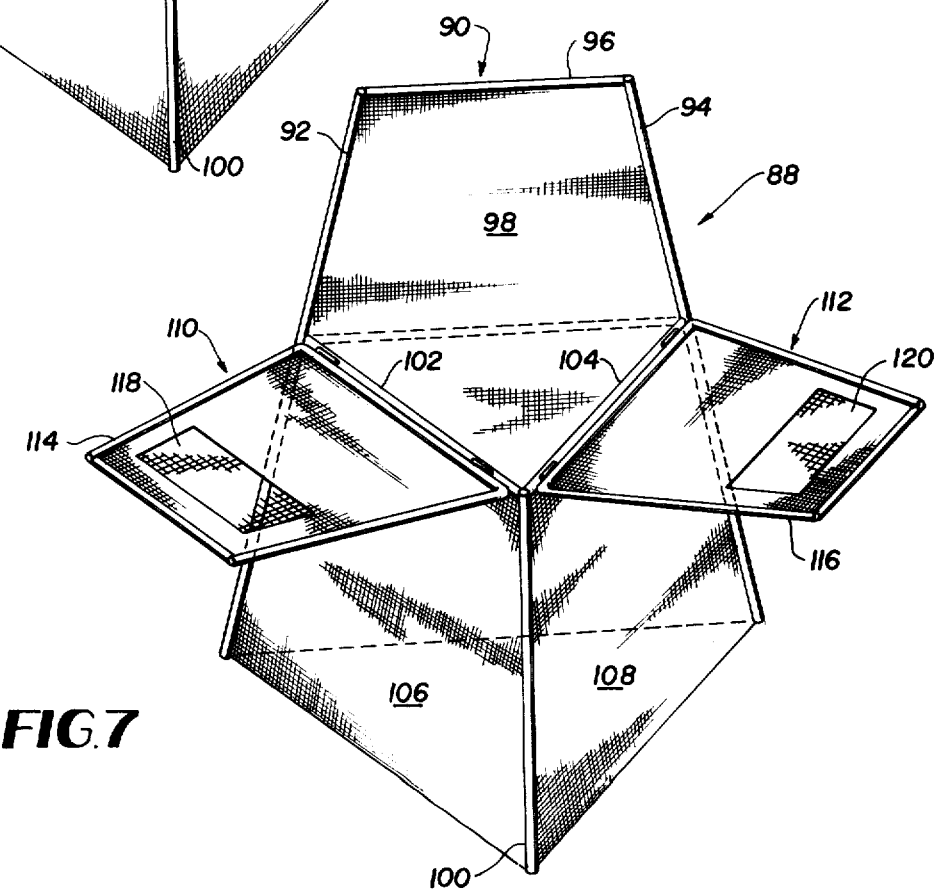

PORTABLE BLIND

BACKGROUND OF THE INVENTION

This invention relates to a blind for a hunter, photographer, naturalist or the like. More particularly this invention relates to a portable blind which may be facially transported to a desired site and quickly and easily erected for use.

In the past blinds of various types have been known which are designed to provide concealment for a hunter or the like while waiting for game to be either enticed or driven close enough for a sporting shot. In a similar manner a photographer or naturalist may want to film and/or study animals in their natural environment at a range which could not be achieved if the animals were able to detect the full presence of a human being.

Blinds of the foregoing type have ranged from mere cavities cut out in underbrush to elaborate igloo enclosures covered with earth and plantings. One difficulty with temporary, makeshift blinds is that the degree of cover and comfort afforded by such structures is often inadequate. Moreover in some instances, such as on an open plain or the like a desired viewing site may not provide enough natural vegetation to construct a suitable makeshift enclosure. On the other hand blinds of more elaborate and permanent design tend to be time consuming to initially construct and are thereafter essentially immobile.

The difficulties suggestes in the preceding are not intended to be exhaustive, but rather are among many which may tend to reudce the effectiveness of previously known blinds. Other noteworthy problems may also exist; however, those presented above should be sufficient to demonstrate blinds appearing in the past will admit to worthwhile improvement.

In the above connection it would be highly desirable to provide a blind which could be facially carried from site to site and quickly and easily erected without relying upon the use of on site materials. It would also be desirable to provide a blind which would afford a user a high degree of concealment while concomitantly permitting a full 360° viewing span for the user.

It would also be desirable to provide a hunting blind for an individual which would provide a quick and full opening capability in order to afford a hunter with an unencumbered shot.

OBJECTS OF THE INVENTION

It is therefore a general object of the invention to provide a novel portable blind which will obviate or minimize prior difficulties while providing desired features of the type previously described.

It is a particular object of the invention to provide a novel blind which may be facially transported by a user to a desired site.

It is another object of the invention to provide a novel blind which may be worn by a user like a poncho or cape during transportation of the blind.

It is yet another object of the invention to provide a novel blind which will afford a user a high degree of concealment.

It is a further object of the invention to provide a novel blind which is self-contained and does not rely upon natural vegetation to provide concealment.

It is yet a further object of the invention to provide a novel blind which will provide a user with a full 360° range of view.

It is still a further object of the invention to provide a novel blind which provides a quick opening capability so that a hunter may be rapidly provided with an unencumbered shot.

THE DRAWINGS

Other objects and advantages of the present invention will become apparent from the following detailed description of preferred embodiments thereof taken in conjunction with the accompanying drawings, wherein:

FIG. 1 is an axonometric view of a user transporting a blind, according to a preferred embodiment of the invention, by wearing the blind as a cape or the like;

FIG. 2 is an axonometric view of the blind in accordance with one preferred embodiment of the invention in an assembled condition with a user concealed within the blind;

FIG. 3 is an axonometric view of the blind depicted in FIG. 2 rapidly falling away as a hunter rises to take an unencumbered shot;

FIG. 4 is an axonometric view of a blind frame composed of a first and second shell constructed with inflatable tubular members which are operably positioned back-to-back;

FIG. 5 is an axonometric view of an alternate embodiment of the invention wherein a blind frame is composed of a first and second shell constructed with lightweight metallic frame members which are operably positioned back-to-back;

FIG. 6 is an axonometric view of another preferred embodiment of the invention wherein panel portions of a triangular blind are hinged and are operable to facially fall away as a hunter uses to take a shot; and FIG. 7 is an axonometric view of the blind depicted in FIG. 6 with front panel portions in an open position.

DETAILED DESCRIPTION

Referring now to the drawings, wherein like numerals indicate like parts, FIGS. 1-3 disclose a blind 10 in accordance with a preferred embodiment of the invention.

The blind 10, note FIGS. 2-4, is structurally fabricated with a first frame 12 and a second frame 14 which operably sit back-to-back.

The frame 12 includes a plurality of legs 16, 18 and 20 preferably formed from inflatable tubular members. The legs are interconnected at the upper ends thereof with a generally semi-circular inflatable tubular member 22. The legs slope outwardly from the tubular member 22 and at the lower ends terminate in a posture lying generally upon an imaginary semicircle 24.

A second semicircular, inflatable member 26 extends in an elevated parallel posture with respect to semicircular member 26 and is connected thereto by at least a pair of vertical columns 30 and 32.

An inflation valve 34 is connected into the tubular frame system to permit the frame to be operably inflated or deflated by a user with a compressed air cylinder (not shown) or the like or by application of a user's breath as desired.

In a similar vein the frame 14 includes three outwardly sloping inflatable legs 40, 42 and 44 which extend from an inflatable semicircular member 46 and lie at the free ends thereof generally upon the periphery of an imaginary semicircle 48. A second semicircular member 50 extends in an elevated parallel posture with respect to member 46 and is held in position by generally vertical columns 52 and 54. An inflation valve 56 is fitted into the frame 14 for inflating or deflating the tubular frame members as desired.

The lateral extent of the frame 12 is covered with a flexible camouflage material 60, note FIG. 2. This material may be colored or imprinted with an irregular design to simulate the colors and shapes of objects in the environment of intended use. The semicircular members 22 and 26 are covered with a flexible mesh or screen material 62 of the type preferably having relatively small openings thus permitting a user 64 to view through the screen at close distance while at the same time providing a desired degree of camouflage from the sight of game at a much greater distance from the screen material.

In a similar manner, the frame 14 is covered with a flexible camouflage material 66 and the upper cylindrical portion of the frame is covered by a screen material 68.

In operation, the tubular frames 12 and 14 are deflated and a user 64, such as a hunter, may lace the frames together and wear the unit to a site as a poncho, note FIG. 1. In this connection, the flexible material 60 and 66 may be selected to be waterproof and thus protect the hunter from occasional rain or snow.

At a desired site, the tubular frames 12 and 14 are inflated and positioned back-to-back whereupon the blind 10 assumes the configuration of a truncated cone with a cylindrical upper portion. In this operative posture, the hunter's body is completely surrounded by the truncated cone of camouflage material and thus is completely concealed from external view. The hunter's head is surrounded by the cylindrical net or screen which provides concealment in all substantial respects while providing the user with a full 360° viewing range.

In the event game comes within shooting range, the hunter merely stands up, knocking the front half of the blind forward to take an unobstructed shot, note FIG. 3. After the shot is taken, the blind is repositioned with the halves operably placed back-to-back and the hunter kneels, crouches or sits within the blind to wait for another shot.

In FIG. 5 an alternate embodiment of the invention is shown comprising a first frame assembly 70 and a second frame assembly 72 fabricated in all substantial respects in a manner similar to the previously described frame assemblies depicted in FIG. 4 with the exception that frames 70 and 72 are constructed from a lightweight metallic material such as tubular aluminum or the like or even from a synthetic resin composition reinforced with fiber glass as desired.

Additionally, the embodiment of the invention depicted in FIG. 5 includes a crossing beam 74 spanning opposing legs 76 and 78 of one of the frame assemblies. A brace 80 connects the crossing beam 74 with a third leg 82. A seat 84 is positioned upon the beam and brace so that a user may use the blind in a seated position.

Another preferred embodiment of the invention is depicted in FIG. 6 and includes a blind 88 constructed with a frame 90 having a generally triangular configuration. More specifically rear legs 92 and 94 extend the full length of the blind and preferably slope inwardly toward the top of the structure. A horizontal brace 96 extends between the upper ends of legs 92 and 94 and provides a degree of structural framing and rigidity for a back panel 98 of flexible camouflage material.

A shorter third leg 100 extends upwardly in a front portion of the blind and is connected to the rear legs 92 and 94 by generally horizontal brace members 102 and 104.

Each of the leg members and/or brace members may be advantageously constructed from inflatable tubular members, lightweight metals or alloys, synthetic resin compositions, etc. as previously discussed in connection with the embodiments of applicant's invention depicted in FIGS. 1-5.

A sheet of flexible camouflage material overlays the bottom portion of leg 92, brace 102 and leg 100 to form a first lower panel 106. In a similar manner a sheet of flexible camouflage material overlays the bottom portion of leg 94, brace 104 and leg 100 to form a second lower panel 108.

The first and second lower panels are provided with extension panels 110 and 112 respectively which are framed with generally U-shaped stiffening strips 114 and 116 and are flexibly hinged to the lower panels along horizontal braces 102 and 104.

The upper portion of each extension panel is preferably provided with a viewing ports 118 and 120 which may be a screen material or the like.

In operation the blind 88 is transported to a desired site in a folded or collapsed condition as previously discussed in connection with blinds depicted in FIGS. 1-5. On site the blind is erected and a hunter or naturalist kneels, crouches or sits within the blind with the extension panels 110 and 112 pivoted into an enclosing posture.

As game approaches a hunter merely stands up and the panels 110 and 112 facially pivot forward and out of the hunter's way to provide a free and unobstructed shot.

In describing a portable blind in accordance with preferred embodiments of the invention, those skilled in the art will recognize several advantages which singularly distinguish the subject invention from previously known devices.

A particular advantage is the provision of a blind which may be facilely transported to a desired site such as by wearing the blind as a poncho.

Another significant feature of the subject invention is the provision of a blind which is self-contained and does not rely on natural vegetation while providing a high degree of concealment for a user.

Further, the subject blind may be rapidly erected at a desired site and provides a novel 360° viewing capability without revealing the existence of a user to an animal at a distance.

Still further, the instant blind may be quickly brushed away or pivoted away so that a hunter or the like is provided with a clear and unobstructed line of sight.

In describing the invention, reference has been made to a preferred embodiment. Those skilled in the art, however, and familiar with the disclosure of the subject invention may recognize additions, deletions, modifications, substitutions and/or other changes which will fall within the purview of the invention as defined in the following claims.

What is claimed is:

1. A blind of the type operable to the facilely transported by a user comprising:
   a first frame means, having
   a first set of at least three legs extending generally upon an imaginary semicircle at the base thereof first semicircular frame means interconnecting the upper ends of said legs such that said legs may be self-supporting in an upright posture, second semicircular frame means positioned above said first semicircular frame means, and generally vertical frame means connected at the respective ends of said first and second semicircular frame means to form one-half of a generally cylindrical frame extension above said at least three legs forming one-half of a truncated conical frame;

a second frame means, having a second set of at least three legs extending generally upon an imaginary semicircle at the base thereof, third semicircular means interconnecting the upper ends of said legs such that said legs may be self-supporting in an upright posture, where fourth semicircular frame means positioned above said third semicircular frame means, and generally vertical frame means connected at the respective ends of said third and fourth semicircular frame means to form one-half of a generally cylindrical frame extension above said at least three legs forming one-half of a truncated conical frame; where said first frame means and said second frame means may be operably positioned such that said first, second, third and fourth semicircular frame means form a cylinder and said first frame means and said second frame means forms a generally truncated conical structural shell;

first flexible cover means connected to said first frame means for extending about and forming a first covering shell over said first frame means;

second flexible cover means connected to said second frame means for extending about and forming a second covering shell over said second frame means;

said first flexible means connected to said first frame means and said second flexible means connected to said second frame means operably serve to form a blind enclosure about a user when said first and second frame means are positioned to form an enclosed shell whereby one-half of said enclosed shell may be facilely bumped away by a user.

2. A blind as defined in claim 1 wherein said first and second frame means each comprise:

a tripod of three inflatable tubular legs; and a semicircular inflatable tubular members connected to the uppermost portions of said legs.

3. A blind as defined in claim 2 wherein:

said tripod of three inflatable tubular legs of each of said first and second frame means extend outwardly from said semicircular inflatable tubular members; and the free ends of each of said legs lie generally upon the circumference of an imaginary semicircle to form a shell of inflatable tubular legs comprising one-half of a truncated cone.

4. A blind as defined in claim 1 and further comprising:

a semicylindrical screen material connected about each of said semicylindrical frame extensions and being operable to screen a user from exterior detection while concomitantly permitting the user to observe objects through the screen material.

5. A blind as defined in claim 1 wherein said first and second frame means each comprise:

a tripod of three rigid legs; and a semicircular rigid frame connected to the uppermost portions of said legs.

6. A blind as defined in claim 5 wherein:

said tripod of three rigid legs of each of said first and second frame means extend outwardly from said semi-circular rigid frames; and the free ends of each of said legs lie generally upon the circumference of an imaginary semicircle to form a rigid frame shell comprising one-half of a truncated cone.

7. A blind as defined in claim 6 and further comprising:

seat means connected in a generally horizontal posture to a lateral portion of said rigid legs of at least one of said first and second frame means for providing a seat for a user of the blind.

8. A blind of the type operably to be facilely transported by a user comprising:

frame means, having first and second upwardly extending and inwardly sloping legs a third upwardly extending and inwardly sloping leg having an axial length less than the length of said first and second legs, and brace means extending from an upper portion of said third leg to a portion of said first and second legs intermediate the ends thereof first flexible cover means connected between said first and second legs;

second flexible cover means connected between said first leg and said third leg;

third flexible cover means connected between said second leg and said third leg;

first panel means flexibly hinged to said brace means between said first leg and said third leg and extending upwardly from said brace means to a position adjacent an upper end of said first leg; and second panel means flexibly hinged to said brace means between said second leg and said third leg and extending upwardly from said brace means to a position adjacent an upper end of said second leg; wherein said first and second panel means may be swung toward and away from an upper end of the blind to close or open the blind as desired.

9. A blind of the type operably to be facilely transported by a user as defined in claim 8 wherein:

said first, second, and third legs and said brace means are composed of inflatable tubular members.

10. A blind of the type operable to be facilely transported by a user as defined in claim 8 wherein:

each of said first and second panel means is positioned with viewer means positioned within the upper portion thereof for providing a field of view for a user positioned within the interior of the blind.

* * * * *